US012014287B2

(12) United States Patent
Bhide et al.

(10) Patent No.: US 12,014,287 B2
(45) Date of Patent: Jun. 18, 2024

(54) BATCH SCORING MODEL FAIRNESS

(71) Applicant: International Business Machines Corporation, Armonk, NY (US)

(72) Inventors: Manish Anand Bhide, Hyderabad (IN); Ravi Chandra Chamarthy, Hyderabad (IN); Prashant Pandurang Mundhe, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 17/111,757

(22) Filed: Dec. 4, 2020

(65) Prior Publication Data

US 2022/0180222 A1 Jun. 9, 2022

(51) Int. Cl.
*G06N 5/04* (2023.01)
*G06F 16/23* (2019.01)
*G06N 20/00* (2019.01)

(52) U.S. Cl.
CPC .......... *G06N 5/04* (2013.01); *G06F 16/2379* (2019.01); *G06N 20/00* (2019.01)

(58) Field of Classification Search
CPC ....... G06N 5/04; G06N 20/00; G06F 16/2379
USPC ....................................................... 707/615
See application file for complete search history.

(56) References Cited

U.S. PATENT DOCUMENTS

| 2013/0246300 | A1* | 9/2013 | Fischer | G06Q 50/12 |
| | | | | 705/347 |
| 2016/0224803 | A1* | 8/2016 | Frank | G06F 21/6245 |
| 2016/0306844 | A1* | 10/2016 | Frank | G06Q 30/0203 |
| 2017/0330058 | A1 | 11/2017 | Silberman et al. | |
| 2019/0362396 | A1* | 11/2019 | Srivastava | G06Q 30/0282 |
| 2020/0160180 | A1* | 5/2020 | Lehr | G06N 3/08 |
| 2020/0167653 | A1 | 5/2020 | Manjunath et al. | |
| 2020/0175424 | A1 | 6/2020 | Kursun | |
| 2020/0320428 | A1* | 10/2020 | Chaloulos | G06N 20/00 |
| 2020/0372067 | A1* | 11/2020 | Otero | G06F 16/48 |
| 2020/0380309 | A1* | 12/2020 | Weider | G06F 18/2178 |

OTHER PUBLICATIONS

Mell, P. et al., "The NIST Definition of Cloud Computing", Recommendations of the National Institute of Standards and Technology, NIST Special Publication 800-145, 7 pages, Sep. 2011.

* cited by examiner

*Primary Examiner* — Hosain T Alam
*Assistant Examiner* — Nicholas E Allen
(74) *Attorney, Agent, or Firm* — Peter J. Edwards

(57) ABSTRACT

A system and related method score a fairness of an outcome model. The method comprises receiving a set of original transaction records (OTRs), and selecting an OTR subset of the OTRs according to a subset selection criteria in order to reduce a number of OTRs to send to outcome model. For each OTR in the subset a perturbed transaction record (PTR) is created based on the OTR that includes changing at least one attribute in the PTR from the OTR, sending the OTR and the PTR to the outcome model, receiving an OTR outcome and a PTR outcome from the outcome model, and determining a record bias score for the OTR outcome and the PTR outcome respectively that indicates bias in the respective outcome. The OTR and the PTR bias score are stored in a bias determination system (BDS) database.

14 Claims, 5 Drawing Sheets

BATCH SCORING MODEL FAIRNESS

BACKGROUND

Disclosed herein is a system and related method for addressing batch scoring model fairness, and particularly for reducing a number of records that are sent to the AI model so that the bias of a particular model can be analyzed.

Artificial intelligence (AI) and other models for determining outcomes in various situations may be a valuable tool in many areas. However, it is possible that some such models may exhibit bias for certain attributes, thus, it is desirable to be able to detect such bias so that appropriate measures may be taken with the model, however, it should be possible to do so while minimizing the impact of testing various inputs on the model, which consume resources.

SUMMARY

According to one aspect disclosed herein, a computer-implemented method is provided to score a fairness of an outcome model. The method comprises receiving a set of original transaction records (OTRs), and selecting an OTR subset of the OTRs according to a subset selection criteria in order to reduce a number of OTRs to send to outcome model. For each OTR in the subset a perturbed transaction record (PTR) is created based on the OTR that includes changing at least one attribute in the PTR from the OTR, sending the OTR and the PTR to the outcome model, receiving an OTR outcome and a PTR outcome from the outcome model, and determining a record bias score for the OTR outcome and the PTR outcome respectively that indicates bias in the respective outcome. The OTR and the PTR bias score are stored in a bias determination system (BDS) database.

According to another aspect disclosed herein, a system scores a fairness of an outcome model. The system comprises a memory, and a processor configured to receive a set of original transaction records (OTRs), and select an OTR subset of the OTRs according to a subset selection criteria in order to reduce a number of OTRs to send to outcome model. For each OTR in the subset, the system creates a perturbed transaction record (PTR) based on the OTR that includes changing at least one attribute in the PTR from the OTR, sends the OTR and the PTR to the outcome model, receives an OTR outcome and a PTR outcome from the outcome model, and determines a record bias score for the OTR outcome and the PTR outcome respectively that indicates bias in the respective outcome. The system stores the OTR and the PTR bias score in a bias determination system (BDS) database.

According to another aspect disclosed herein, a computer program product is provided for scoring a fairness of an outcome model that implements the processes described above. The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
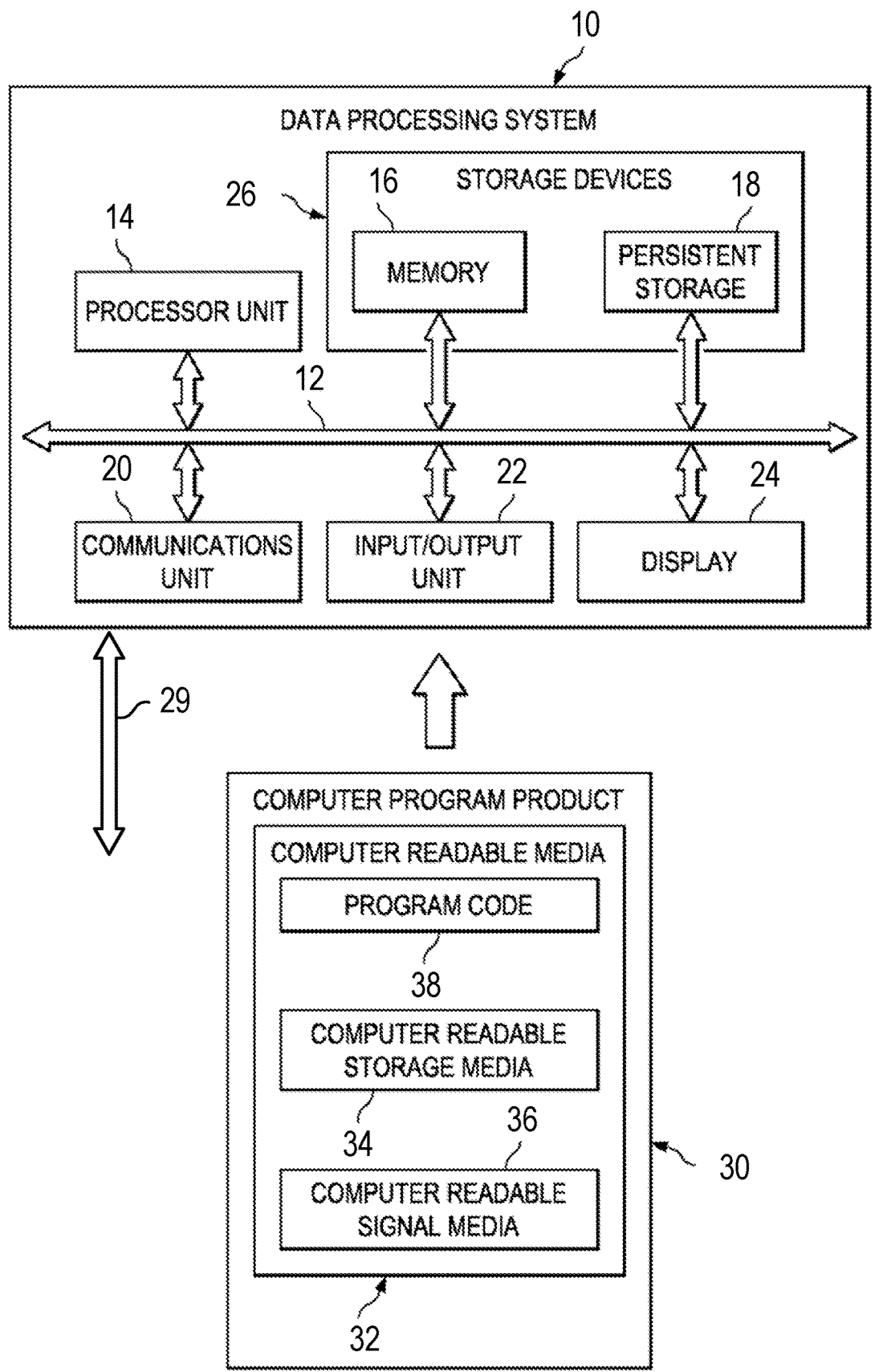
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network
Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multicore processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
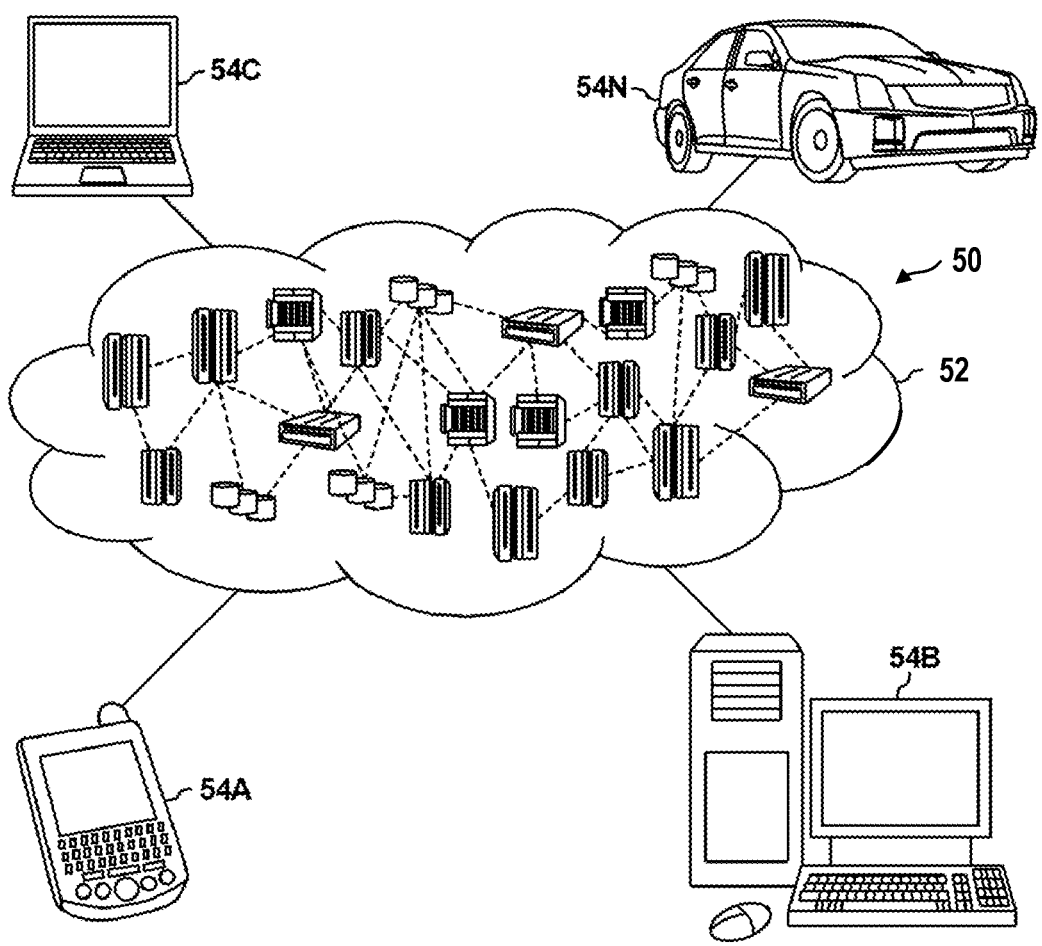
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
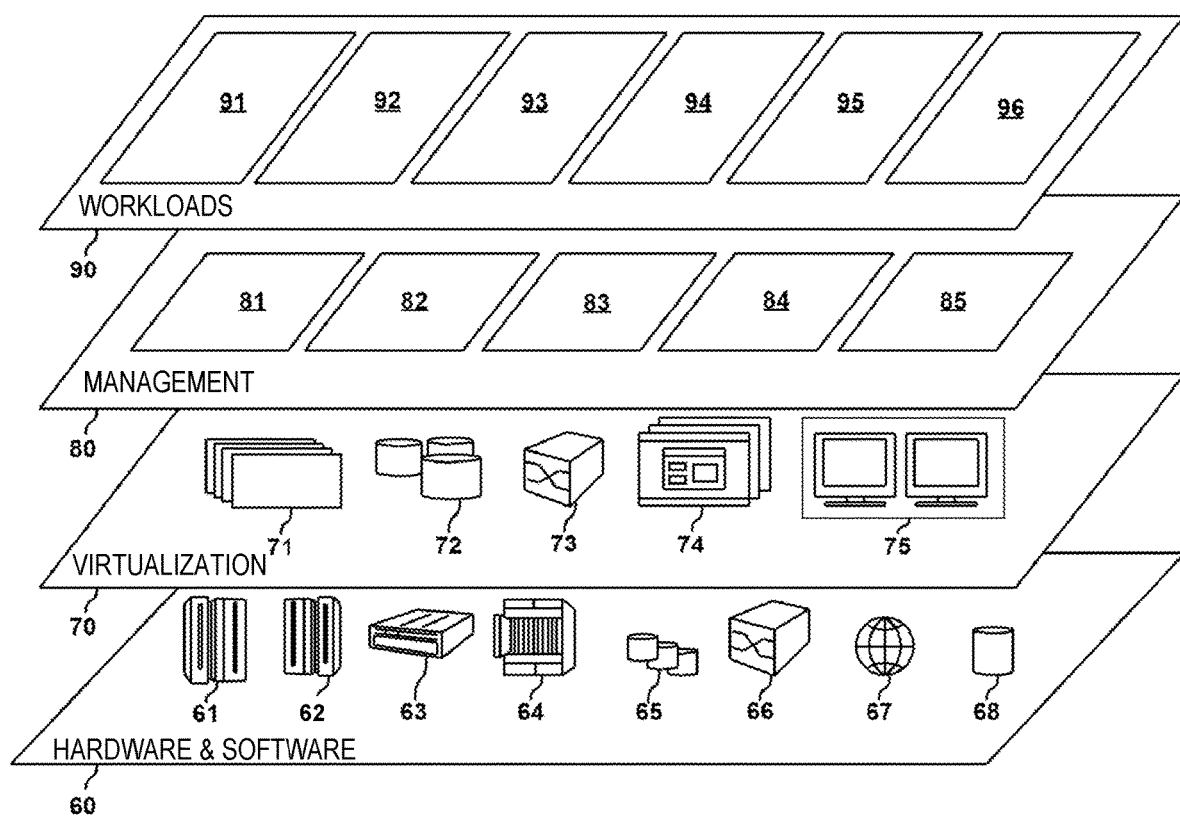
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Efficient Batch Scoring Model Fairness

The use of artificial intelligence (AI) has expanded greatly in the past few decades, and with it the ability to solve problems that were previously unsolvable. However, one problem that has evolved recently is that AI models may be subject to bias—which may be due to a variety of causes. Detecting bias in AI models is important for building trust in such models, and there are various techniques for detecting bias in AI models. However, some preliminary definitions of terms are provided before addressing the system and methods disclosed herein.

TABLE 1

Term Definitions

| Term | Definition |
| --- | --- |
| fairness attribute | Bias/fairness is typically measured using some fairness attribute, such as gender, ethnicity, age, etc. Bias/fairness can also be measured using non-societal attributes, such as policy age (to ensure that the model is not biased against new customers), etc. |
| monitored/reference group | A monitored group of values include those values of the fairness attribute for which bias is to be measured. The rest of the group values of the fairness attribute are called the reference group. By way of example, in the case where the fairness attribute = gender, if one is trying to measure bias against females, then the monitored group is "female" and reference group is "male". Attributes may include age ranges, gender, race, or any other group that may form the basis of bias. |
| favorable/unfavorable outcome | An important concept in bias detection is that of favorable and unfavorable outcome of the model. By way of example, an insurance claim approved can be considered as a favorable outcome and an insurance claim denied can be considered as an unfavorable outcome. |
| disparate impact | Disparate impact is represented by a fairness value and is used to measure bias and is computed as the ratio of percentage of favorable outcomes for the monitored group to the percentage of favorable outcomes for the reference group. Bias is said to exist if the disparate impact value is below some bias threshold. By way of example, if 80% of claims made by males are approved whereas only 60% of claims made by females are approved, then the disparate impact will be: 60/80 = 0.75. Typically, the threshold value for bias is 0.8. Since, in the example, the disparate impact ratio is less than 0.8, the model is said to be biased. |
| bias threshold | The bias threshold value is a value that may allow a small level of measured (but possibly not actual) bias to exist before triggering a bias response. By way of example, if the bias threshold is 1, this means that we expect females to get the same or better claim approval rates as compared to males. However, in some scenarios, it might acceptable if the monitored group gets a slightly less favorable outcome as compared to the reference group due to, e.g., statistical artifacts and the like. In order to handle this, the customer can set the threshold value for each model to a value less than 1. Typically, the bias threshold value is set to 0.8. |

Figure 2:
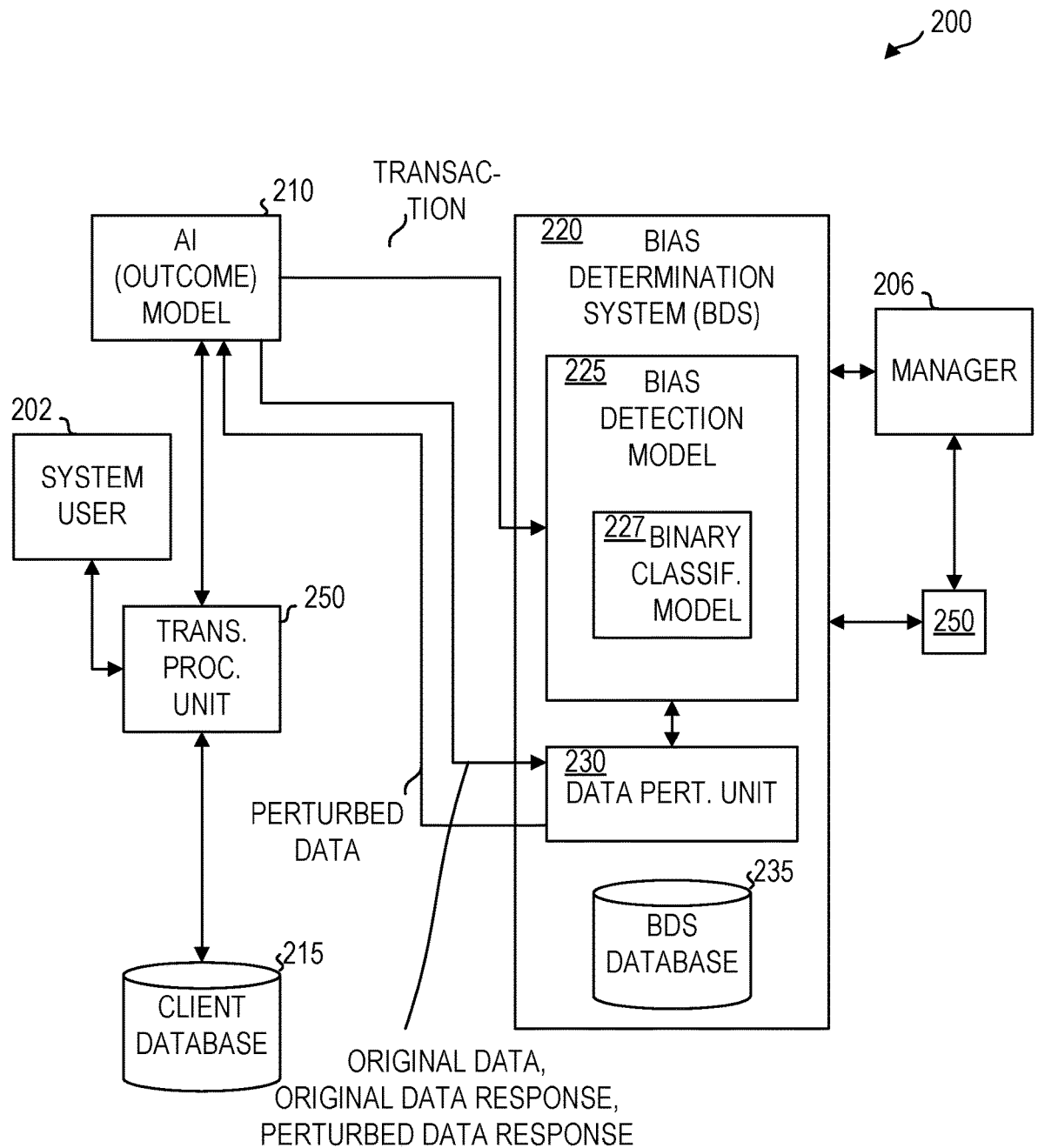
FIG. 2 is a block diagram illustrating various components of a system in which bias detection is performed, according to some embodiments.

FIG. 2 is a block diagram of a system 200 within which bias detection is performed. A bias determination system 220 comprises various components, including: a binary classification model 227, a bias detection model (BDM) 225 that performs bias detection against an AI (or other) outcome model 210 associated with a customer's person database 215, and a data perturbation unit 230 that is used to perturb data from the customer's person database 215 or model scored data that is used for scoring the data. The output of this scoring contains the predictions for each transaction. And on this data we would perform the bias checking by applying the said disclosure of optimally perturb the data to know more meaningful fairness insights of the model. Information about original transaction records (OTRs) and perturbed transaction records (PTRs) may be stored in the bias determination system database 235. The bias detection model 225 may operate in two phases. In the first phase, the behavior of the outcome model 210 is learned by the BDM 225. In the second phase, the learned model behavior may be used to reduce a number of records used for scoring the outcome model 210. This record reduction may improve the efficiency of the system 200 when determining whether bias exists or not in the outcome model 210.

In order to accurately detect fairness, OTRs from the client database 215 (or possibly test data) is copied, perturbed by the data perturbation unit 230, and sent back to the outcome model 210 for a predicted response that is subsequently scored. This causes a problem when the outcome model 210 accepts very large amounts of data, which is typically the case in models that support batch scoring. For example, one large telecommunication company has a model which accepts 80 million records during one batch scoring request. If 80 million records were to be perturbed and sent back to the model for scoring, the model will experience a huge load. Hence, a technique is provided herein to reduce the number of records sent to the model for scoring, while at the same time still being able to identify the bias in outcome model 210 behavior accurately.

By way of example, the number of data points (transactions) are 100, and the client has specified the percentage of records which need to be sent for scoring to be 10%. Then 10 records out of 100 records are perturbed and sent to the outcome model 210 for original customer model scoring. The outcome model 210 produces an outcome in the form of outcome predictions for these records. With the original and their perturbed records, a binary classification model is built which, given a transaction, predicts if the model is likely to exhibit biased behaviour on the transaction. This may be constructed as follows: using the original and perturbed data, if the original data had age=18, and prediction=loan denied and after perturbation age=40 and prediction=loan approved, then it is known that the model is exhibiting bias on these two data points.

There may be other data points where the model has not shown biased behaviour. All the data points where the model exhibits bias are labeled "Biased" and the rest as "Unbiased". This data is used as training data to build a new bias detection model. When a new transaction is given to the bias detection model, it will check if the transaction is similar to any transaction that model has seen in the past where the model exhibited biased behaviour. If that is true, then the bias detection model will predict that the model is likely to exhibit bias on this new transaction. The bias detection model, when given a transaction, predicts whether the transaction is biased or not. The bias detection model is used to run the other remaining records (the remaining 90% of them) and check for their bias nature. This computes the fairness on the overall 100% of the records.

First Phase—Bias Detection Model Building/Learning Phase

In some embodiments, the system user 202 or manager 206 can, in the first phase, specify a percentage of records or data from the database 215 or batch submission that are to be sent to the outcome model 210 for scoring by the bias detection model 225. Let that percentage be X %. In the first phase, X % of the data received by the outcome model 210 is perturbed by the data perturbation unit 230 and, also in the first phase, sent back to the outcome model 210 for scoring. The disparate impact, via the fairness value may be determined by using the original plus the perturbed records. Using the example above, the client may specify that 0.1% (X %) of the 80 million records are to be perturbed. In that case, 80 thousand original records would thus be copied and perturbed by the data perturbation unit 230 and sent to the outcome model 210 for scoring.

The data perturbation unit 230 perturbs the data in a way that allows for detection of bias, namely by changing (perturbing) a single variable in the original data record to see what impact the change has on the result when presented to the outcome model 210. This perturbance process may be illustrated by way of an example use case. Here, a scenario is provided in which potential bias is examined in handling a customer's insurance claim by an insurance company. In this example, the fairness attribute is age, and the monitored group is ages 18-24. This leaves the reference group as comprising customers aged 25 and over.

In this example scenario, the payload data consists of 100 insurance claims (i.e., the model has been used to make decisions for 100 claims). In these claims, 60 claims were made by people in the age group 18-24, and 40 claims were made by people in the age group 25. All of the people in the age group 18-24 had very high claim frequency and were known to have made problematic (for any variety of reasons, e.g., lack of adequate information, etc.) claims in the past. Hence, the outcome model 210 rejected all the 60 claims made by customers belonging to the age group 18-24. On the other hand, the 40 claims made by people with age 25 were all non-problematic claims and hence were approved by the outcome model 210. This may be represented in Table 2 below.

TABLE 2

Example Table

| Age | Total Claims | Outcome | |
| --- | --- | --- | --- |
| | | Unfavorable (claim rejected) | Favorable (claim approved) |
| 18-24 | 60 | 60 | 0 |
| ≥25 | 40 | 0 | 40 |

A measure of the disparate impact based on age for this model would be 0/1=0. In general, the disparate impact ratio may be calculated as: (No. of favorable minority/Total no. of minority)/(No. of favorable majority/Total no. of majority). Hence, the model behavior would be flagged as being biased. However, the outcome model 210 here is not really acting in a biased manner, as it is making an accurate decision based on the data provided to it. Thus, if such a outcome model 210 is reported as being biased, it is not something that the business owner would want to fix, as they would obviously not want to approve a problematic claim just be fair.

In order to address this issue, a data perturbation is performed by the data perturbation unit 230 while computing the fairness. The way the data perturbation unit 230 works here is illustrated as follows. If there is a claim by a person who is, for example, age 20 (i.e., in the monitored group), and their claim was rejected by the model, the record is perturbed by the data perturbation unit 230 by flipping the age from 20 to a random value in the reference group (say 40). The perturbed record is then sent to the outcome model 210. All of the other features of the record are kept the same. If the outcome model 210 predicts that the claim is approved, then it means that the outcome model 210 is acting in a biased manner by making decisions just based on the age of the customer (and not based on the other factors that suggest approving or denying the claim that may be in the record). Thus, while computing bias in the outcome model 210, a copy of the original data is perturbed and the bias detection model 225 computes the disparate impact using the payload (the original unperturbed data), and the perturbed data. This ensures that bias is reported (by the bias detection model 225 to a model validator who is checking whether the outcome model 210 is exhibiting any bias or not) only if there are a sufficient (statistically determined) number of data points where the outcome model 210 has exhibited biased behavior across the original unperturbed data and the perturbed data. Using this process, it is possible to detect if there is genuine bias in the outcome model 210 and to not get impacted by the kind of data being received by the outcome model 210 by using the perturbation.

Second Phase—Bias Detection Model Predicting and Scoring Data Reduction Phase

A binary classification model 227 may also be built by, e.g., the bias detection model 225 which, given a transaction from, e.g., the transaction processing unit 250 in the second phase, predicts if the outcome model 210 is likely to exhibit biased behavior on the transaction and uses this prediction to decide whether to send this transaction data to the outcome model 210 whose result will be scored. This is constructed as indicated in the following example. Given the original and the perturbed data, if the original data for the transaction had age=18 (monitored group) and the predicted outcome was prediction=loan denied (unfavorable outcome), and after perturbation age=40 (reference group) and the prediction was prediction=loan approved (favorable outcome), then it is determined that the model is exhibiting bias on these two data points.

In more general terms, a set of members of the OTR set are selected to form an OTR subset based on one or more conditions. Although the invention is not limited in the following way, in some embodiments a first condition may be if the outcome model 210 is predicted to output a biased OTR and a second condition may be if there is a threshold value of uncertainty in this prediction, both of which may determine of a particular OTR from the set is included in the OTR subset. A third condition may be if the number of records has, at a maximum or a minimum, some user specified quantity of records.

Other data points may be present where the outcome model 210 has not shown biased behavior. All the data points or attributes may be labeled where the outcome model 210 exhibits bias as "biased" and the rest as "unbiased", although in some embodiments a continuous "degree of bias" may be used. This data may be used as training data to build a new bias detection model 225 (or modify an existing one). When a new (or test) transaction is provided to the bias detection model 225, it will check the database 215 to see if it is similar to any transaction that it has received in the past where the outcome model 210 exhibited biased behavior. If so, then the bias detection model 225 predicts that the outcome model 210 is likely to exhibit bias on this new transaction.

In the second phase, the bias detection model 225 is utilized to reduce the number of records that need to be sent to the outcome model 210 to be used for scoring. The following may be done in the second phase. A set of OTRs may be sent to the bias detection model 225 with the notion that only a smaller subset of the OTRs (or resultant PTRs) will be selected for sending to the outcome model 210 so that it can provide an outcome/decision based on the record it received. For each record received by the bias detection model 225 from the database 215 or the transaction processing unit 250 (e.g., some other source), a copy of the OTR is created, and this copy is perturbed by the data perturbation unit 230. Both the original and perturbed records are provided to the bias detection model 225.

In order to be included in the OTR/PTR subset, a determination is made by the bias detection model 225 as to whether the record under consideration is predicted to show bias (PBS). The bias detection model 225 may do this by examining similar records in the bias detection model database 235 for which bias or non-bias has already been determined and use these records as a basis for making the prediction.

If the bias detection model 225 predicts that the outcome model 210 is going to act in a biased manner for either of the records (the OTR or the PTR), then the confidence of the bias detection model 225 is checked in the prediction. The confidence value may be determined based on how many past records that have been scored are similar to the current record under consideration. If there are many similar records, and they have all ultimately been scored the same way, then the confidence is quite high that the outcome model 210 is going to provide an outcome that will be scored the same way. On the other hand, if few or no similar records exist (and/or if the outcomes vary significantly), then confidence may be considered low (i.e., low confidence in prediction (LCP) that falls below a threshold low confidence level), and such a determination may be made based on a predetermined confidence threshold (e.g., >70%). An LCP means that few, if any, similar records have been seen by the outcome model 210, making the OTR/PTR good candidates for outcome model 210 consideration.

If the confidence is high that the outcome model 210 will act in a biased manner, based on some predetermined threshold, then as a result the prediction is determined for the perturbed record. For example, if the original record had age=18-24 (minority/monitored group) and prediction=rejected (unfavorable), then the perturbed record prediction is assumed to be favorable. If, on the other hand, the original record had age=≥25 (majority/reference group) and prediction=approved (favorable), then the perturbed record prediction is assumed to be unfavorable. This perturbed record is not sent for actual prediction because the prediction for the perturbed record has been identified using the bias detection model 225.

In some embodiments, if the record is both PSB and has LCP, then the OTR and PTR are included in the OTR subset that is then submitted to the outcome model 210 for an outcome. In some embodiments, a user specified quantity (USQ) or records may be specified in addition. The USQ may be specified as a percentage of the OTR set (e.g., a 10% USQ on an OTR set of 1000 records would specify 100 records in the OTR subset that is sent to the outcome model 210. How the USQ is treated depends on whether the USQ specifies a minimum quantity or a maximum quantity. If the USQ specifies a maximum quantity and there are more PSB & LCP records than the USQ, some of the PSB & LCP records are omitted from the OTR subset. Otherwise, only the number of records meeting the PSB & LCP criteria are submitted.

In the above example, if 138 of the 1000 OTR set records meet the PSB & LCP criteria, but the USQ of 100 records specifies a maximum, then only 100 of the PSB & LCP records make it into the OTR subset. However, if 78 of the 1000 OTR set records meet the PSB & LCP criteria, then all 78 of the 1000 OTR set records make it into the OTR subset.

On the other hand, if the USQ specifies a minimum quantity, and there are not enough records in the OTR set to meet the PSB & LCP criteria, then other records may be included in the OTR subset. By way of example, if the USQ is 100 records (specifying a minimum) and only 78 out of the 1000 OTR set records meet the PSB & LCP criteria, then 22 other records may be included to make up the shortfall. These "make up" records may meet only one of the criteria. For example, a record predicted not to show bias may still be included if it has a low confidence score (i.e., ~PSB and LCP). Other combinations may be considered as well (e.g., PSB and ~LCP, ~PSB and ~LCP).

The USQ may be specified as a percentage, an absolute number, or based on some other mathematical formulation, and such a value may be modified dynamically based on other criteria. For example, if the outcome model 210 is running on a computer with very limited resource capacity, then the USQ may be dynamically adjusted to a lower value. However, if the outcome model is running on a computer with many available resources, then the USQ may be dynamically adjusted to a higher value.

With the above approach, it is possible to reduce the number of records that need to be sent for scoring. Every time the perturbed data is scored (or at some predefined points in time), the bias detection model 225 may be rebuilt in a learning process. Over time, the bias detection model 225 becomes better and it is able to determine a prediction of the perturbed record more often, thereby further reducing the amount of data that needs to be sent to the outcome model 210 for scoring.

Figures 3A, 3B:
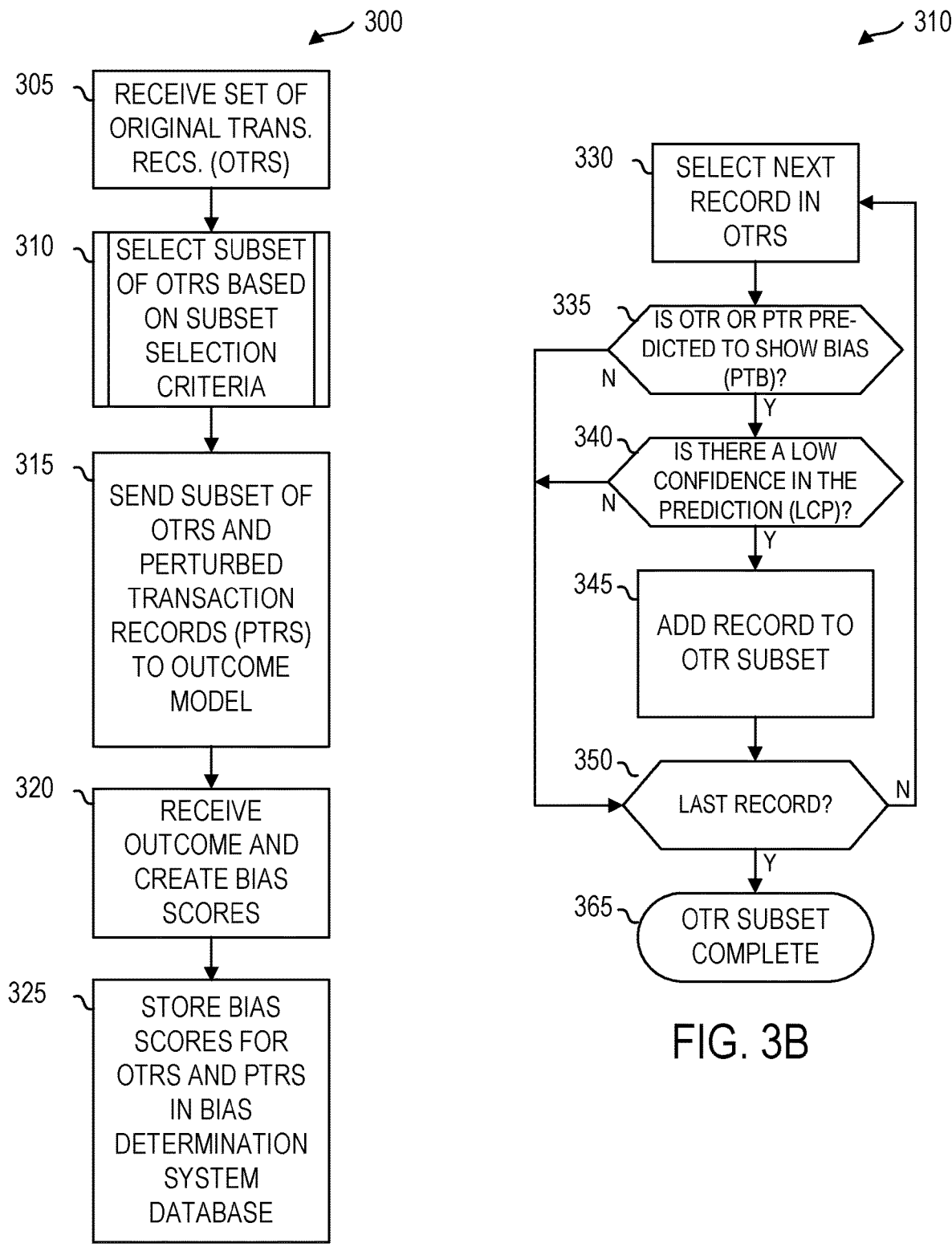
FIGS. 3A and 3B are flowcharts that illustrate processes for reducing a number of records that are sent to an AI model for processing.

FIG. 3A is a flowchart illustrating an overall process 300 for determining bias in the outcome model 210. In operation 305, the bias detection model 225 receives a set of OTRs from either a client database 215 or via some other mechanism, such as the transaction processing unit 250. In operation 310, a subset of the set of OTRs is selected by the bias detection model 225 based on subset selection criteria, which is discussed in more detail below.

In operation 315, the subset of OTRs/PTRs is sent to the outcome model 210 for processing by the model, and in operation 320, the outcome is received by the bias detection model 225 for scoring. The received outcomes are scored for bias, and in operation 325, the outcome information and their scores may be stored in the bias determination system database 235 for future use.

FIG. 3B is a flowchart that expands on operation (process) 310, namely, how the subset of OTRs are selected from the OTR set. The process 310 creates a loop via operations 330 and operation 350 that loops through the records in the OTR set. In operation 335, the bias detection model determines if the OTR or its PTR if the OTR under consideration is predicted to show bias, e.g., based on examining historical records in the bias determination system database 235. If not (335:N), then processing of the next record continues. If so (335:Y), then, in operation 340, a determination is made as to whether the prediction is below a particular confidence threshold (i.e., a low confidence in the prediction LCP). If not (340:N), then processing of the next record continues. If so (340:Y), then the OTR and PTR may be added to the OTR subset. A determination is made as to whether this is the last record in operation 350. If not (350:N), processing continues by selecting the next record in operation 330. Otherwise, the OTR subset is complete and processing completes at 365.

As noted above, a user supplied quantity (USQ) may modify the contents of the OTR subset so that the subset contains a maximum or a minimum of the USQ.

Technical Application

The one or more embodiments disclosed herein accordingly provide an improvement to computer technology. For example, the system disclosed herein represents an improvement to an AI algorithm efficiently tests an AI or other outcome model by submitting a selected subset of records that are used for testing and thus allows for more effective implementation of AI technology.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for scoring a fairness of an outcome model, the method comprising:
   receiving a set of original transaction records (OTRs);
   selecting an OTR subset of the OTRs according to a subset selection criteria in order to reduce a number of OTRs to send to the outcome model and leaving at least one attribute unchanged;
   for each OTR in the subset:
      creating a perturbed transaction record (PTR) based on the OTR that includes changing at least one attribute in the PTR from the OTR;
      sending the OTR and the PTR to the outcome model;
      receiving an OTR outcome and a PTR outcome from the outcome model;
      determining a record bias score for the OTR outcome and the PTR outcome respectively that indicates bias in the respective outcome;
      storing the OTR and the PTR bias score in a bias determination system (BDS) database; and
      reporting the outcome model as biased based on the record bias score to a model validator;
   wherein:
      the selecting of the OTR subset comprises:
         for each OTR in the set of OTRs:
            determining whether a first condition is true, wherein the first condition is whether the OTR or a related PTR is predicted to show bias (PSB) were it submitted to the outcome model;
            determining whether a second condition is true, wherein the second condition is whether a confidence in the PSB determination has a low confidence in prediction (LCP) that falls below a threshold low confidence level; and
            adding the OTR to the OTR subset based upon at least one of the first condition and the second condition; and
         the adding of the OTR to the OTR subset is based upon both the first condition and the second condition being true;
      the method further comprising:
         receiving a user specified quantity (USQ) of records serving as lower or upper boundary for a size of the subset; and
         utilizing the USQ for the selecting of the OTR subset.

2. The method of claim 1, further comprising:
   conditioned upon: a) the USQ of records serving as a lower boundary for a size of the subset, and b) a quantity of the OTRs in the OTR set failing to meet the first condition and the second condition, then adding additional records to the OTR subset from the OTR set that do not meet both the first and the second conditions.

3. The method of claim 1, further comprising:
   conditioned upon: a) the USQ of records serving as an upper boundary for a size of the subset, and b) a quantity of the OTRs in the OTR set that meet the first condition and the second condition exceeding the USQ, then withholding some OTRs from the subset that do meet both the first and the second conditions.

4. The method of claim 1, wherein the USQ is provided as a percentage of the OTR set.

5. The method of claim 1, wherein the USQ is provided as a number of records in the OTR subset.

6. The method of claim 1, wherein creating the PTR comprises:
   selecting an attribute of the OTR having a set of monitored group values for a monitored group of the OTR set and a set of reference group values for a reference group of the OTR set that differ from the monitored group values, wherein a size of the set of monitored group values is one or more, and a size of the reference group values is one or more;
   copying the OTR into the PTR;
   selecting the attribute in the PTR, and:
      conditioned upon the selected attribute value being from the reference group values, replacing the selected attribute value with one of the monitored group values; and
      conditioned upon the selected attribute value being from the monitored group values, replacing selected attribute value with one of the reference group values.

7. The method of claim 6, wherein:
   the replacing of the selected attribute value utilizes a randomization function.

8. The method of claim 6, wherein the attribute is gender and the attribute values include male and female.

9. The method of claim 6, wherein the attribute is age and the attribute values include separate age ranges.

10. The method of claim 1, wherein the determining of the record bias score comprises:
setting the record bias score to one, which represents no bias, conditioned upon the OTR and the PTR outcome being the same; and
setting the record bias score to zero, which represents bias, conditioned upon the OTR and the PTR outcome being different.

11. The method of claim 1, wherein the determining of whether a record being considered is predicted to show bias comprises:
locating a stored record in the BDS database having a predetermined degree of similarity to the record being considered;
determining that the located stored record indicates bias; and
determining that the record being considered is PSB.

12. The method of claim 11, wherein the determining of whether a confidence in the PSB determination has a low confidence utilizes previously determined OTR outcomes and PTR outcomes from the outcome model.

13. A system for scoring a fairness of an outcome model, the system comprising:
a memory; and
a processor configured to:
receive a set of original transaction records (OTRs);
select an OTR subset of the OTRs according to a subset selection criteria in order to reduce a number of OTRs to send to the outcome model and leave at least one attribute unchanged;
for each OTR in the subset:
create a perturbed transaction record (PTR) based on the OTR that includes changing at least one attribute in the PTR from the OTR;
send the OTR and the PTR to the outcome model;
receive an OTR outcome and a PTR outcome from the outcome model;
determine a record bias score for the OTR outcome and the PTR outcome respectively that indicates bias in the respective outcome;
store the OTR and the PTR bias score in a bias determination system (BDS) database; and
report the outcome model as biased based on the record bias score to a model validator;
wherein:
the selection of the OTR subset comprises:
for each OTR in the set of OTRs, causing the processor to:
determine whether a first condition is true, wherein the first condition is whether the OTR or a related PTR is predicted to show bias (PSB) were it submitted to the outcome model;
determine whether a second condition is true, wherein the second condition is whether a confidence in the PSB determination has a low confidence in prediction (LCP) that falls below a threshold low confidence level; and
add the OTR to the OTR subset based upon at least one of the first condition and the second condition; and
the addition of the OTR to the OTR subset is based upon both the first condition and the second condition being true;
the processor further being configured to:
receive a user specified quantity (USQ) of records serving as lower or upper boundary for a size of the subset; and
utilize the USQ for the selecting of the OTR subset.

14. A computer program product for scoring a fairness of an outcome model, the computer program product comprising a computer readable storage medium having computer-readable program code embodied therewith to, when executed on a processor:
receive a set of original transaction records (OTRs);
select an OTR subset of the OTRs according to a subset selection criteria in order to reduce a number of OTRs to send to the outcome model and leave at least one attribute unchanged;
for each OTR in the subset:
create a perturbed transaction record (PTR) based on the OTR that includes changing at least one attribute in the PTR from the OTR;
send the OTR and the PTR to the outcome model;
receive an OTR outcome and a PTR outcome from the outcome model;
determine a record bias score for the OTR outcome and the PTR outcome respectively that indicates bias in the respective outcome;
store the OTR and the PTR bias score in a bias determination system (BDS) database; and
report the outcome model as biased based on the record bias score to a model validator;
wherein:
the selection of the OTR subset comprises:
for each OTR in the set of OTRs, causing the processor to:
determine whether a first condition is true, wherein the first condition is whether the OTR or a related PTR is predicted to show bias (PSB) were it submitted to the outcome model;
determine whether a second condition is true, wherein the second condition is whether a confidence in the PSB determination has a low confidence in prediction (LCP) that falls below a threshold low confidence level; and
add the OTR to the OTR subset based upon at least one of the first condition and the second condition; and
the addition of the OTR to the OTR subset is based upon both the first condition and the second condition being true;
the processor further being configured to:
receive a user specified quantity (USQ) of records serving as lower or upper boundary for a size of the subset; and
utilize the USQ for the selecting of the OTR subset.

* * * * *